US006688842B2

(12) United States Patent
Boatner

(10) Patent No.: US 6,688,842 B2
(45) Date of Patent: Feb. 10, 2004

(54) VERTICAL AXIS WIND ENGINE

(76) Inventor: Bruce E. Boatner, 29507 Pebble Beach Dr., Murrieta, CA (US) 92563

( * ) Notice: Subject to any disclaimer, the term of this patent is extended or adjusted under 35 U.S.C. 154(b) by 5 days.

(21) Appl. No.: 10/178,209

(22) Filed: Jun. 24, 2002

(65) Prior Publication Data

US 2003/0235498 A1 Dec. 25, 2003

(51) Int. Cl.[7] .................................. F03D 7/00
(52) U.S. Cl. ................... 415/4.002; 415/4.4; 415/907; 416/140
(58) Field of Search ................. 415/4.2, 4.4, 907; 416/119, 140

(56) References Cited

U.S. PATENT DOCUMENTS

| | | | |
|---|---|---|---|
| 226,357 A | | 4/1880 | Saccone |
| 232,205 A | * | 9/1880 | Preston ............... 416/119 |
| 2,038,467 A | | 4/1936 | Zanoski |
| 4,184,084 A | * | 1/1980 | Crehore ............... 290/55 |
| 4,383,801 A | | 5/1983 | Pryor |
| 4,408,956 A | | 10/1983 | Price, Sr. |
| 4,474,529 A | | 10/1984 | Kinsey |
| D300,932 S | | 5/1989 | Sikes |

* cited by examiner

Primary Examiner—Edward K. Look
Assistant Examiner—Kimya N McCoy
(74) Attorney, Agent, or Firm—Loyal McKinley Hanson

(57) ABSTRACT

A vertical axis wind engine, also referred to as a vertical axis wind turbine (VAWT) includes a support structure, a rotor mounted rotatably on the support structure for rotation about a vertical axis, and at least one airfoil for causing the rotor to rotate about the vertical axis in response to wind passing the wind engine. The airfoil has vertically extending leading and trailing edges, an angle-of-attack axis extending horizontally through the leading and trailing edges, and a pivotal axis extending vertically intermediate the leading and trailing edges. The airfoil is mounted on the rotor for pivotal movement about the pivotal axis and the rotor includes components for limiting pivotal movement of the airfoil to first and second limits of pivotal movement. The airfoil is free to pivot about the pivotal axis intermediate the first and second limits of pivotal movement as the rotor rotates about the vertical axis in order to thereby enable the airfoil to align the angle-of-attack axis according to the wind. Preferably, the wind engine has more than one free-flying, self-positioning airfoil, and the rotor includes first and second stops for each airfoil that augment virtual stop effects to limit pivotal movement to a radially aligned first limit and a tangentially aligned second limit. According to another aspect of the invention, multiple wind engines are stacked. Yet another aspect provides an exponentially shaped structure surrounding the vertical axis that funnels wind toward the rotor.

2 Claims, 10 Drawing Sheets

VERTICAL AXIS WIND ENGINE

BACKGROUND OF THE INVENTION

1. Technical Field

This invention relates generally to wind turbines and the like, and more particular to a vertical axis wind turbine that utilizes the kinetic energy of moving air to provide rotational energy useable for generating electric power and/or other useful purposes.

2. Description of Related Art

Wind turbines usually take the form of horizontal axis wind turbines (HAWTs) and vertical axis wind turbines (VAWTs). By virtue of their vertical axes of rotation, VAWTs do not require alignment with the windstream. In addition, drive train components can be located at ground level instead of being mounted higher above ground at HAWT rotor level. For those and other reasons, VAWTs attract attention . . . especially for commercial electric power generating purposes.

VAWTs include drag-based designs and lift-based designs. U.S. Pat. No. 226,357 issued Apr. 6, 1880 to Saccone, for example, describes an early, drag-based, vertical axis, windmill design. Designed over twenty years before the Wright brothers' flight, the windmill uses flat "fans" mounted pivotally on a support structure in order to catch the wind and cause the support structure to rotate. As the fans orbit the vertical axis, they pivot between a downwind orientation, in which each presents a broad profile in order to catch the wind, and an upwind orientation in which each presents a narrower profile for less drag. The windmill was designed without the benefit of aerodynamic design and performance theory. Operation is jerky, rough, and slow as the fans are continually pulled out of position by centrifugal force. The fans provide drive only intermittently during a somewhat small portion of each rotation. Upright bars at the outermost ends of the fans are highly disruptive to airflow. The system cannot achieve rotor speeds faster than wind speed.

U.S. Pat. No. 2,038,467 issued some fifty-six years later on Apr. 21, 1936 to Zonoski describes another vertical axis, drag-based, windmill design utilizing flat "vanes" on a rotatable frame. The two-phase vanes are better balanced. As they orbit the vertical axis, they pivot about 170 degrees, or so, between a high-drag downwind orientation and a low-drag upwind orientation. Although the windmill shows potential for drag rotation over 180 degrees of each revolution, wind shadow and vane interference reduces overall effectiveness, and relative wind reduces the draft phase to less than 180 degrees. U.S. Pat. Nos. 4,408,956; 4,474,529; and U.S. Pat. No. Des. 300,932 show other drag-based designs.

U.S. Pat. No. 4,383,801 issued May 17, 1983 to Pryor shows a lift-based VAWT. It includes vertically aligned airfoils mounted pivotally on a rotatable support. As the airfoils drive the support, they orbit the vertical axis. Meanwhile, a wind-vane-controlled pitch adjustment continually orients the airfoils relative to the wind direction. The machine detects wind direction by means of a vane and positions the controlling pitch flange accordingly. The mechanism is somewhat complicated, and positioning of the airfoils (angle of attack) is optimized only in the directly upwind and directly leeward positions, using crosswind lift force in both cases. In addition, FIGS. 8 through 11 in the patent illustrate somewhat complex mechanisms for manipulating the airfoil shapes. The airfoils are underutilized during most of each rotation. The additional control appears to be an attempt to improve the efficiency of the machine. In a class of VAWTs called cycloturbines, the pitch of the airfoils is controlled to create crosswind lift, but they must run at rotor speeds in excess of wind speed to be effective. They also frequently have difficulty self-starting.

Thus, the prior art has progressed to the use of airfoils in lift-based VAWT designs. More efficient conversion of wind energy is still desirable, however, along with better VAWT mechanical attributes. So a need exists for a better VAWT . . . preferably a lift-based VAWT incorporating benefits of modern aerodynamic design and performance theory.

SUMMARY OF THE INVENTION

It is an object of this invention to overcome the forgoing and other disadvantages of prior art wind turbines. This object is achieved by providing a VAWT (referred to herein as a vertical axis wind engine) having "free flying" airfoils that self position according to the local dynamic conditions to which they are subjected, thus creating a condition of equilibrium under which a highly efficient means of wind energy extraction may be established. More particularly, the vertical axis wind engine includes a rotor mounted on a support structure for rotation about a vertical axis. At least one airfoil mounted pivotally on the rotor (preferably more than one) causes the rotor to rotate under influence of the wind. The airfoil is mounted on the rotor so that it is free to pivot between preset first and second limits of pivotal movement (e.g., set by stop mechanisms). That arrangement enables the airfoil to align according to the wind as it orbits the vertical axis, thereby achieving better conversion of wind energy to useable rotational energy by combining lift and drag characteristics at low speeds and shifting to lift-only characteristics at rotor speeds approaching or exceeding local wind speed.

The dynamic phase lag effect of the free flying airfoils creates a "virtual stop." Recall the Law of Conservation of Angular Momentum and consider its influence in combination with airfoil responsiveness to the instantaneous force of the true relative wind (TRW) acting on an airfoil. The result is that the airfoil resists rotational changes along its pivotal axis and shifts out of phase relative to its rotor position. That is what the stops do also. The stops cannot be completely eliminated, however, because they are required during start-up, operation at low speed, heavy load conditions, turbulence, and wind direction shifts requiring reorientation and stabilization of the system. The stops are important in getting the system up to equilibrium speed.

To paraphrase some of the more precise language appearing in the claims and introduce the nomenclature used, a vertical axis wind engine constructed according to the invention includes a support structure, a rotor mounted rotatably on the support structure for rotation about a vertical axis, and at least one airfoil mounted on the rotor for causing the rotor to rotate about the vertical axis in response to wind passing the wind engine. The airfoil has vertically extending leading and trailing edges, an angle-of-attack axis extending horizontally through the leading and trailing edges, and a pivotal axis extending vertically intermediate the leading and trailing edges. The airfoil is mounted on the rotor for pivotal movement about the pivotal axis and the rotor includes means for limiting pivotal movement of the airfoil to first and second limits of pivotal movement.

According to a major aspect of the invention, the airfoil is mounted on the rotor so that the airfoil is free to pivot about the pivotal axis intermediate the first and second limits of pivotal movement as the rotor rotates about the vertical axis. That arrangement enables the airfoil to align the angle-of-attack axis continually according to the wind as it orbits the vertical axis. Preferably, the wind engine has more than one airfoil and the rotor includes first and second stops for each airfoil that limit pivotal movement to a radially aligned first limit and a tangentially aligned second limit. According to another aspect of the invention, multiple wind engines are stacked. Yet another aspect provides an exponentially shaped structure surrounding the vertical axis that funnels wind toward the rotor.

In terms of its many advantageous design features, the wind engine of the invention is a vertical axis wind engine with one or more self-positioning airfoils that achieve better conversion of wind energy to useable rotational energy by optimizing the lift and drag characteristics within the appropriate rotor speed ranges. The design uses no cams, gears, levers, or other mechanisms to position the airfoils, thereby reducing design complexity, minimizing frictional overhead, and increasing working efficiency. The energy transfer cycle is optimized by the application of aerodynamics based on airplane and helicopter airfoil flying and stalling characteristics and the physics of conservation of rotational energy. The airfoils optimize each phase in the rotational cycle, using four distinct methods of applying motive force to the rotor armature.

Wind forces and armature-constraining action alone establish airfoil positions. Airfoils rotate freely through an arc of approximately 90 degrees, bounded by stop mechanisms. The airfoil's span of travel is from a radial line along the mounting arm (radially aligned relative to the vertical axis) to a perpendicular position (tangentially aligned relative to the vertical axis). The design allows for each airfoil to set its own instantaneous angle and to adjust to conditions of relative wind, wind shift, and so forth occurring outside and within the wind engine, without external adjustments or mechanisms, wind vanes, centrifugal governors, or other controlling devices. Individual airfoils adjust to local conditions based on changes of rotor speed, turbulence, true relative wind, and other factors affecting each of them independently.

The wind engine is self-starting with two or more airfoils from any rotor position and/or wind condition. The wind engine may be configured as a low-rpm, high torque device for applications such as water pumping, but may also be made to adhere more closely to Betz's Theory (1926) of maximum efficiency. Low-rpm, high torque devices are inherently inefficient because power is a product of torque and rotor speed. Higher rotational RPMs are also more favorable for driving electrical generation equipment. Wind energy is derived by reducing the velocity of an air mass. According to Betz, an ideal turbine system should lower the speed of the wind by a factor of only about one-third. It should also create the minimum amount of interference to the passing wind stream. To reduce rotor "solidity," airfoils can be constructed in a narrow aspect ratio and allowed to rotate faster on a larger rotor radius. The objective is to sweep a large surface area at the highest speed possible, using a minimum number of airfoils (two or three). Despite these significant changes in operating parameters, all aspects of the invention's fundamental working method would remain unchanged. In order to meet Betz's criteria for efficiency, a wind turbine must be able to exploit crosswind lift to produce the necessary airfoil speeds. This is the primary reason why drag-based VAWT designs have garnered less favor in the research community than the HAWT machines.

The wind engine design is scalable, both in terms of overall size and in terms of the number of airfoils utilized. It may be configured in a smaller radius for higher RPM operation, or larger diameter for lower RPM operation and higher torque, or it may be built on a very large scale for power-grid applications.

The wind engine design allows for easy aesthetic placement in the landscape and is ideally suited for supplemental consumer energy, emergency supply, remote sites, camps, or ranch and farm use. It is suited to packaging that is modular and easily stackable, allowing it to be bolted together to create a self-contained tower structure.

The wind engine design exploits a unique combination of aerodynamic lift and drag forces, which can allow for potential top rotor speed (TSR) in excess of wind speed. As rotor speed increases above wind speed, airfoils transition into lift-only mode. If rotor speed decreases below wind speed under load, the system functions effectively due to the large wind exposure area. The airfoils are designed to combine wing/lift as well as turbine/drag functions.

The wind engine design introduces a five-step sequence to wind turbine technology. Power is produced in four of the following five phases:

1. Upwind Lift Phase. This begins approximately in the upwind position and continues to approximately 60 degrees past it, depending on wind and rotor speed conditions.

2. Downwind Drag Phase. This begins at approximately 60 degrees downwind and continues to around the 120 degree position.

3. Transitional Phase. At about the 120 degree position, the airfoil rotates its orientation by 90 degrees and converts its rotational energy into rotor thrust by the law of conservation of rotational inertia.

4. Leeward Lift Phase. Positioned crosswind by the transitional phase, the airfoil now sweeps across the leeward side of the system.

5. Upwind Phase. The airfoil returns to windward, positioning itself for minimum drag.

Thus, the wind engine of the instant invention is a new lift-based VAWT design providing significantly improved performance, mechanical attributes, and aesthetics. The following illustrative drawings and detailed description make the foregoing and other objects, features, and advantages of the invention more apparent.

DESCRIPTION OF THE PREFERRED EMBODIMENTS

Figure 1:
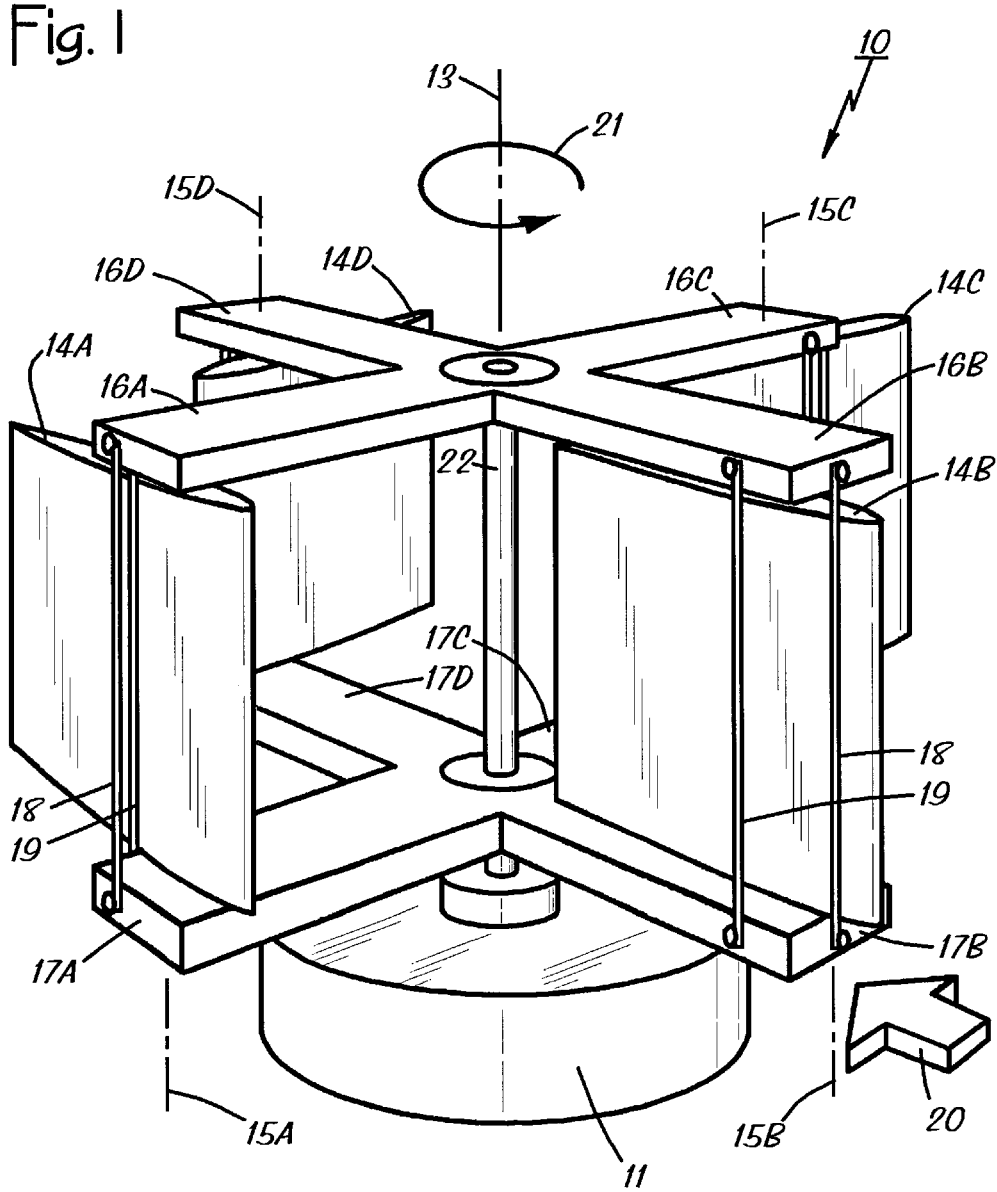
FIG. 1 of the drawings is an isometric view of a vertical axis wind engine constructed according to the invention that includes four airfoils spaced apart on the rotor at ninety degree intervals (orthogonal XYZ coordinates are included for convenience in describing the invention, with the Z axis being vertical)
Figure 1:
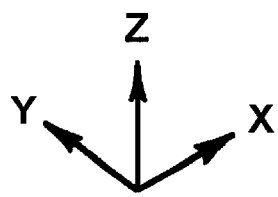
Figure 2:
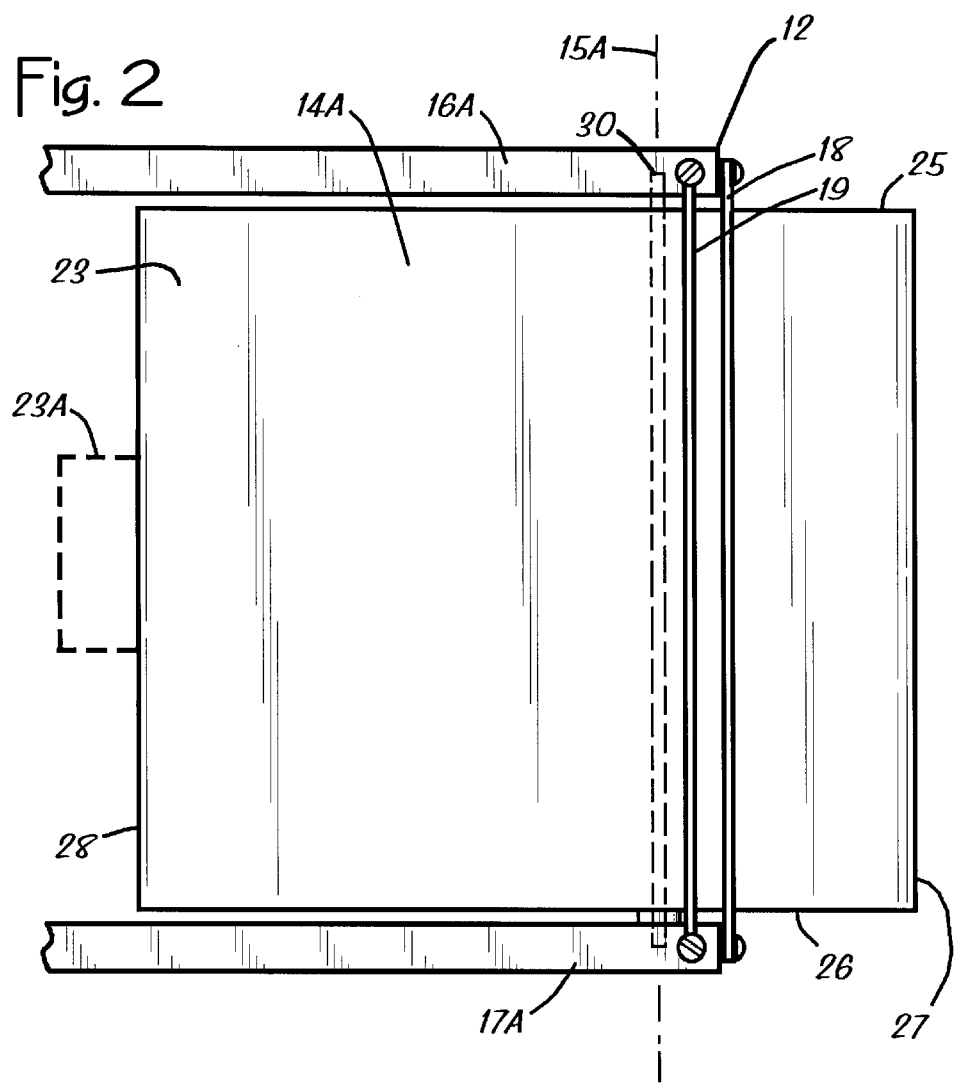
FIG. 2 is an elevation view of one of the airfoils and a portion of the rotor.
Figure 3:
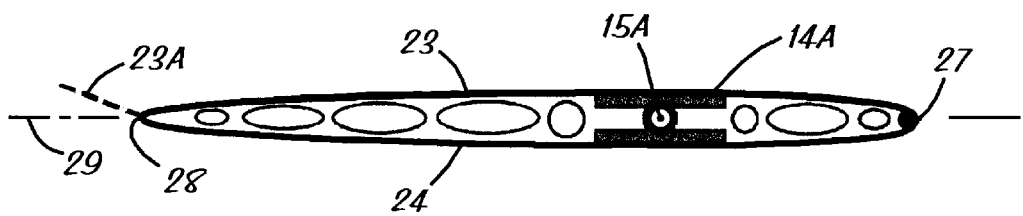
FIG. 3 is a cross sectional view of a typical airfoil as viewed in a horizontal bisecting plane (XY plane)

FIGS. 1–3 of the drawings show various aspects of a VAWT constructed according to the invention in the form of a vertical axis wind engine 10. Generally, the wind engine 10 includes some type of base or support structure 11 (FIG. 1) for supporting the other components, a rotor 12 mounted rotatably on the support structure 11 for rotation about a vertical axis 13, and at least a first airfoil 14A mounted pivotally on the rotor 12 for pivotal movement about a pivotal axis 15A that is parallel to the vertical axis 13. Although the invention works with one airfoil, multiple airfoils are preferable. The one or more airfoils function as means for causing the rotor 12 to rotate about the vertical axis 13 in response to wind passing the wind engine 10. As the rotor 12 rotates, the one or more airfoils orbit the vertical axis 13 on the rotor 12 while pivoting their orientation according to the wind.

The wind engine 10 has four airfoils, including the first airfoil 14A mentioned above, a second airfoil 14B mounted pivotally for pivotal movement about a pivotal axis 15B, a third airfoil 14C mounted pivotally for pivotal movement about a pivotal axis 15C, and a fourth airfoil 14D mounted pivotally for pivotal movement about a pivotal axis 15D. The axes 15A and 15B appear near the bottom of FIG. 1, while the axes 15C and 15D appear near the top. The rotor 12 has upper arms 16A, 16B, 116C and 16D and lower arms 17A, 17B, 17C and 17D that hold the airfoils 14A–C by suitable means (e.g., axles passing through the airfoils that are held by the upper and lower arms). Four first stop members 18 in the form of elastic cords (of which just two are designated with numerals in FIG. 1) span the upper and lower arms along with four similar second stop members 19 (also just two designated). The airfoils 14A–D respond to wind, represented by an arrow 20 in FIG. 1, by causing the rotor to rotate in the direction indicated by an arrow 21, while a drive shaft 22 connected to the rotor 12 functions as means for coupling rotational movement from the rotor 12 to an electric power generator or other useful device. The drive shaft 22 may take the form of a hollow tube mounted coaxially over a fixed post held by the support structure 11 in order to facilitate stacking as described later on.

As an initial idea of size, the illustrated wind engine 10 is about eighteen inches in overall height and two feet in overall diameter. The wind engine design is scalable, however, and embodiments several feet in overall height and overall diameter are described later on.

FIGS. 2 and 3 show further details of the airfoil 14A. The airfoils 14A–D are all similar in construction, mounting, orientation, and operation, and so only the airfoil 14A is described in further detail. It is similar in some respects to an airplane wing, developing a reaction force in response to the flow of air over its surfaces that is generally referred to as lift irrespective of airfoil orientation relative to vertical. The plan-form (shown with the cross sectional view in FIG. 3) is between a wing and turbine blade inasmuch as the airfoil 14A performs aspects of both wing and turbine functions. It is rigid, strong, and fairly lightweight (e.g., aluminum or other suitable material), as its mass affects rotational acceleration during the transitional phase described later on, and it is thin and elongated with symmetrically curved first and second surfaces 23 and 24. A fixed, adjustable trim tab 23A (shown in dashed lines) can play an important role in optimization of the equilibrium lift-only mode, allowing the airfoil 14A to deliver additional rotational lift between Position G and Position B discussed later on with reference to FIG. 7, rather than simply fairing into the relative wind at minimum drag. The effect of this would be increased rotor speed. This trim tab 23A may also help to initiate the transitional phase between Position C and Position D.

In terms of the nomenclature used in this description, the airfoil 14A includes first and second end portions 25 and 26, a leading edge 27 and a trailing edge 28 that both extend between the first and second end portions 25 and 26, an angle-of-attack axis 29 extending horizontally through the leading and trailing edges 27 and 28, and a pivotal axis 15A extending vertically intermediate the leading and trailing edges 27 and 28. The airfoil 14A is mounted on the rotor 12 so that the pivotal axis 15A of the airfoil 14A is parallel to the vertical axis 13 and so that the airfoil 14A is free to pivot about the pivotal axis 13 intermediate first and second limits of pivotal movement set by the stops 18 and 19. As the rotor 12 rotates about the vertical axis 13, the airfoil 14A aligns its orientation (i.e., the orientation of the angle-of-attack axis 29) according to the wind.

The pivotal axis 15A of the airfoil 14A is located approximately one-third of the way back from the leading edge 27, at or near the average center of pressure (lift). An axle 30 illustrated in FIG. 2 in dashed lines is aligned with the pivotal axis 15A. It demonstrates one way of mounting the airfoil 14A pivotally on the arms 16A and 17A of the rotor 12. The airfoil 14A is balanced internally to establish the center of gravity at the pivotal axis 15A. That arrangement is preferred in order to prevent centrifugal force from swinging the trailing edge 28 outward away from the vertical axis 13 because that would create drag and prevent the airfoil 14A from establishing its proper position based on relative wind.

With further regard to the function of the first and second stops 18 and 19 on the airfoil 14A, the first stop 18 functions as means for limiting pivotal movement of the airfoil 14A to a first position of the airfoil 14A in which the angle-of-attack axis 29 extends radially relative to the vertical axis 13. Based upon the foregoing and subsequent descriptions, one of ordinary skill in the art can readily implement the invention and design various stop mechanism to serve that function. For the wind engine 10, the first position of the airfoil is such that the angle-of-attack axis 15A intersects the vertical axis 13, although it need not intersect the vertical axis 13 to fall within the broader inventive concepts disclosed. Similarly, the second stop 19 functions as means for limiting pivotal movement of the airfoil 14A to a second position of the airfoil 14A in which the angle-of-attack axis 29 extends tangentially relative to the vertical axis 13. For the wind engine 10, the second position of the airfoil 14A is such that the angle-of-attack axis 29 is perpendicular to a radial extending between the vertical axis 13 and the pivotal axis 15A, although it need not be fully perpendicular to fall within the broader inventive concepts disclosed.

Turning now to FIGS. 4–8, they are diagrammatic representations of the airfoil 14A as viewed in a horizontal plane (XY plane) from above that illustrate various airfoil orientations during various phases as the rotor 12 rotates about the vertical axis 13. The vertical axis 13 is identified in each view. The first stop 18 and the first limit of pivotal movement the first stop 18 sets are indicated for each airfoil orientation by the outer small circles that are more distant from the vertical axis 13 Oust one such circle being identified in each view with a reference numeral 18). The second stop 19 and the second limit of pivotal movement the second stop 19 sets are indicated for each airfoil orientation by the inner small circles less distant from the vertical axis 13 (just one such circle being identified in each view with a reference numeral 19). The wind or relative wind is indicated in FIGS. 4–8 by the arrows 20A through 20D, and the X and Y axes are included in each view for use in relating FIGS. 4–8 to FIG. 1.

Figure 4:
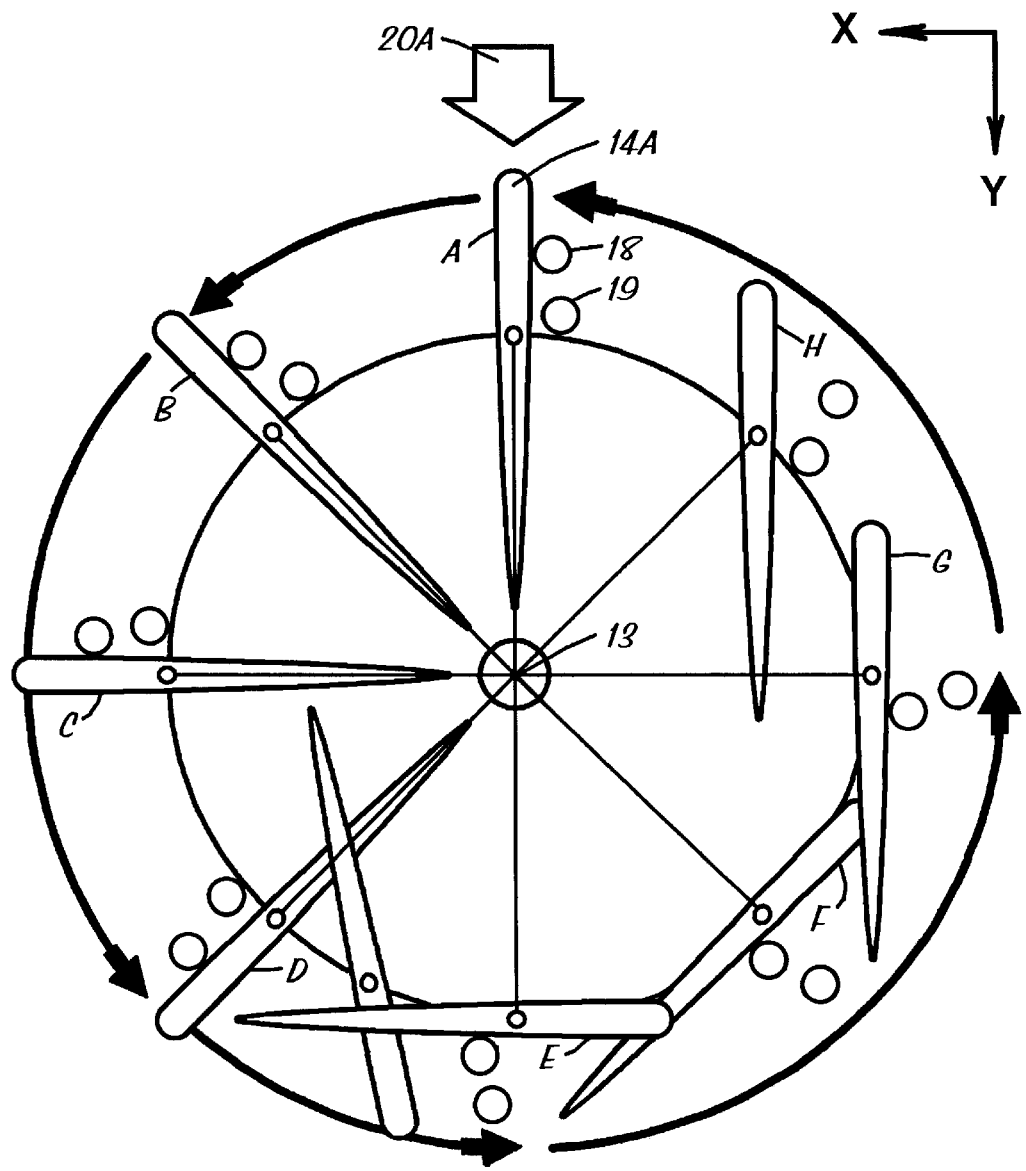
FIG. 4 is a diagrammatic representation (a phase diagram) as view in a horizontal plane (XY plane) that illustrates various airfoil orientations during various phases as the rotor rotates about the vertical axis at low speed.
Figure 5:
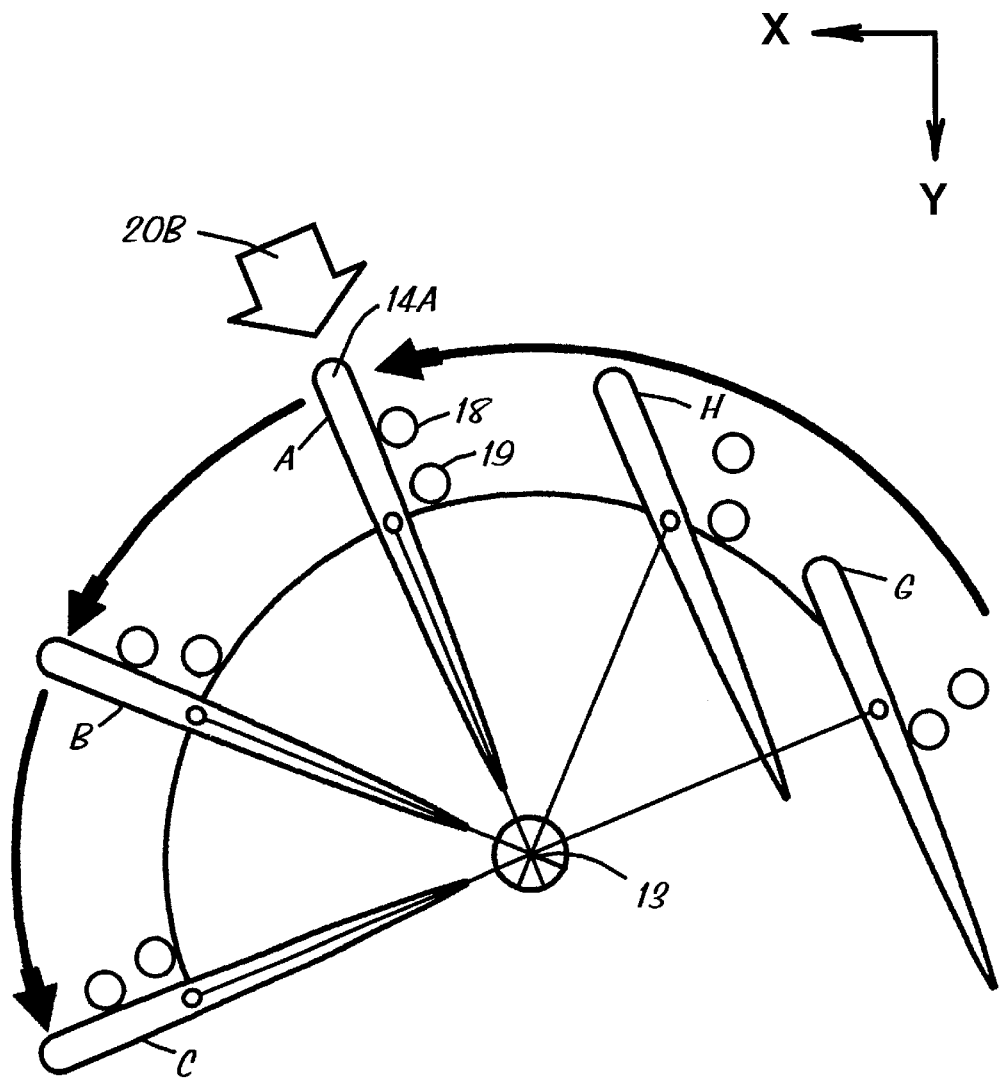
FIG. 5 is a diagrammatic representation similar to FIG. 4 that illustrates some relative wind effects on the airfoil.

FIG. 4 illustrates various positions of the airfoil 14A (identified by reference letters A through H) during one revolution of the rotor 12 about the vertical axis 13. The airfoil 14A orbits the vertical axis 13 while pivoting to the illustrated positions as the rotor 12 rotates in response to static motive forces at work during initial startup and at very low RPM conditions, such as under heavy load. Notice that the wind engine 10 uses both lift and drag effects. Also, there are always three thrust phases working against a single idle phase which produces excellent torque in static and low RPM conditions. Testing shows that a wind engine constructed according to the invention that may freewheel at certain RPMs in moderate winds (60 RPM is typical), continues to operate efficiently in terms of power output when the RPMs are lowered under load (e.g., to 20 RPM). The wind engine 10 appears to achieve equilibrium more easily when a load is applied, so long as the load does not decelerate the rotor 12 to the point of stoppage.

In Position A, the airfoil 14A is in a neutral but unstable condition. The angle of attack is equivalent to that of an airplane wing flying straight and level. However, with other forces on the rotor 12 introduced by other airfoils at other positions, the airfoil 14A at Position A is forced to move counterclockwise away from Position A and the wind 20A toward Position B. As the airfoil 14A moves away from Position A, it is subjected to a sudden and powerful lifting effect, being constrained to a radial orientation by the first stop 18 limiting pivotal movement of the airfoil 14A to the first position of the airfoil 14A mentioned previously in which the central axis of the airfoil 14A extends radially relative to the vertical axis 13. This effect is equivalent to the stalling action of a wing, the airfoil 14A behaving like a flying wing without a horizontal stabilizer. This kind of action is typically very unstable and violent. Holding a symmetrically shaped model airplane wing out of a car window, even at slow speeds, illustrates the power of this stalling action. As long as the wing's leading edge is kept straight into the wind, there is little resistance. However, when the leading edge of the model airplane wing is allowed to increase its angle of attack, there is a sudden an uncontrollable motion upward and backward.

At Position C, the airfoil 14A is still constrained to a radial orientation by the first stop 18, where it produces brute force drag force on the rotor 12. This action guarantees that the four-airfoil wind engine 10 will self start, since there will always be an airfoil positioned at or near this position. Positions A, B, and C are the workhorses of the system that insure that the system produces torque when operating under heavy load and at low RPM. The sailing analogy of Position C, is "running with the wind" as the old square-riggers did.

Position E and Position F are lift phases that produce higher rotor speed when the system is not heavily loaded. During these phases, the airfoil 14A is constrained to a tangential orientation by the second stop 19. limiting pivotal movement of the airfoil 14A to a second position of the airfoil in which the angle-of-attack axis 29 extends tangentially relative to the vertical axis 13. The sailing analogy is a sailboat "on a reach," and this is the usual mode of operation of a propeller type HAWT. The airfoil in a HAWT can easily achieve rotor tip speeds that are faster than the wind driving it. VAWTs, however, seldom have a top rotor speed (TRS) greater than the wind speed. This is usually because of the mass of the rotor, among other things. It is important, then, that the VAWT be a good torque producer in order to be useful in its traditional roles such as pumping water.

Between Position D and Position E, the airfoil 14A goes through a transitional phase, which will be discussed further later on. The sailing analogy is called a "jibe." When the airfoil stops its rotation at Position E, its kinetic energy is converted into rotor torque by the law of conservation of angular momentum. Thus, the airfoil's apparent idle transition time ends up being productive by storing energy to contribute to the forces driving the rotor. From Position G to Position H and back to Position A, the airfoil 14A fairs itself into the wind to produce the minimum amount of drag (wind friction), which can take away from the efficiency of the system. Unlike the other phases that work to produce torque and rotational speed, this phase is an idle or return segment.

Figure 6:
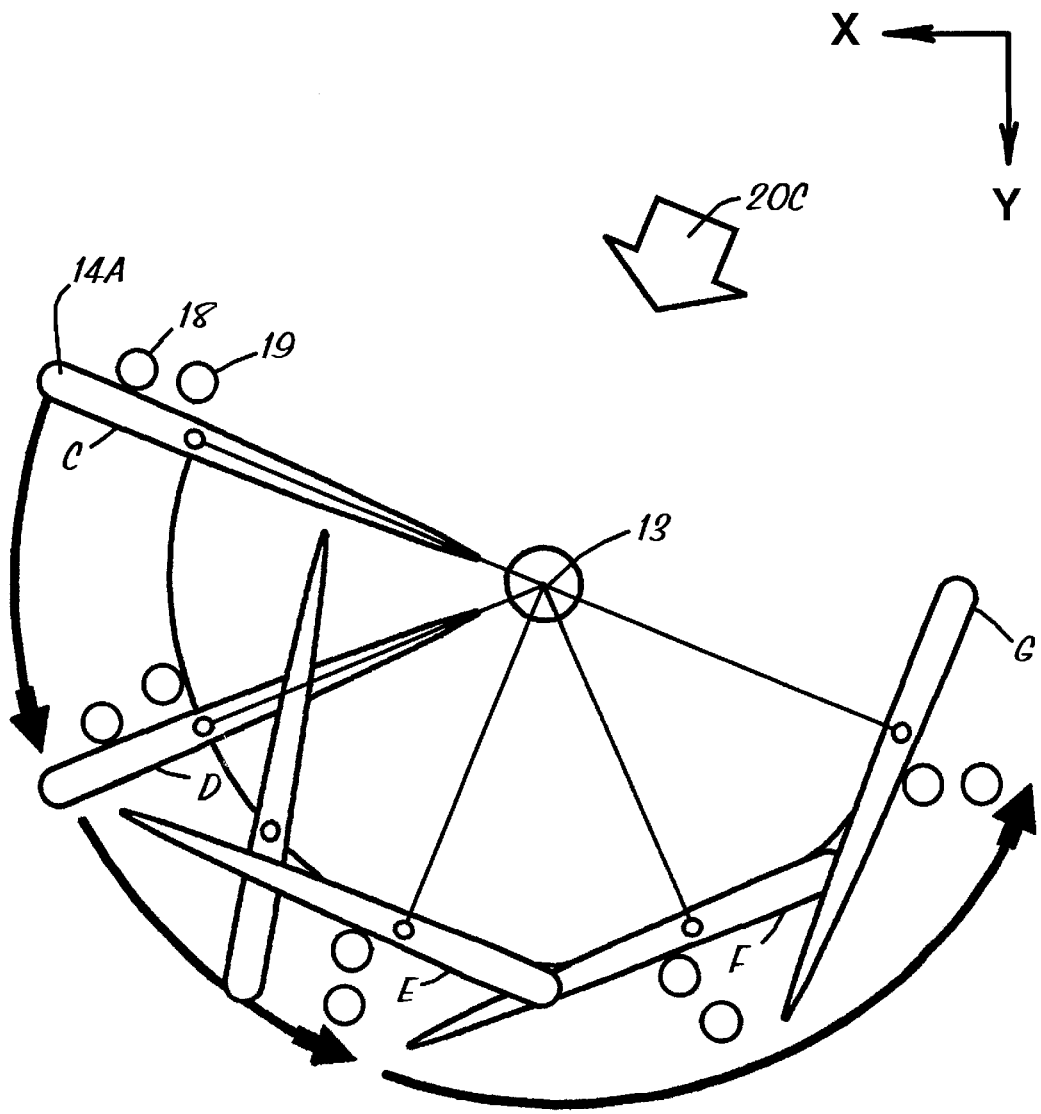
FIG. 6 is a diagrammatic representation similar to FIG. 5 that illustrates additional relative wind effects on the airfoil.
Figure 7:
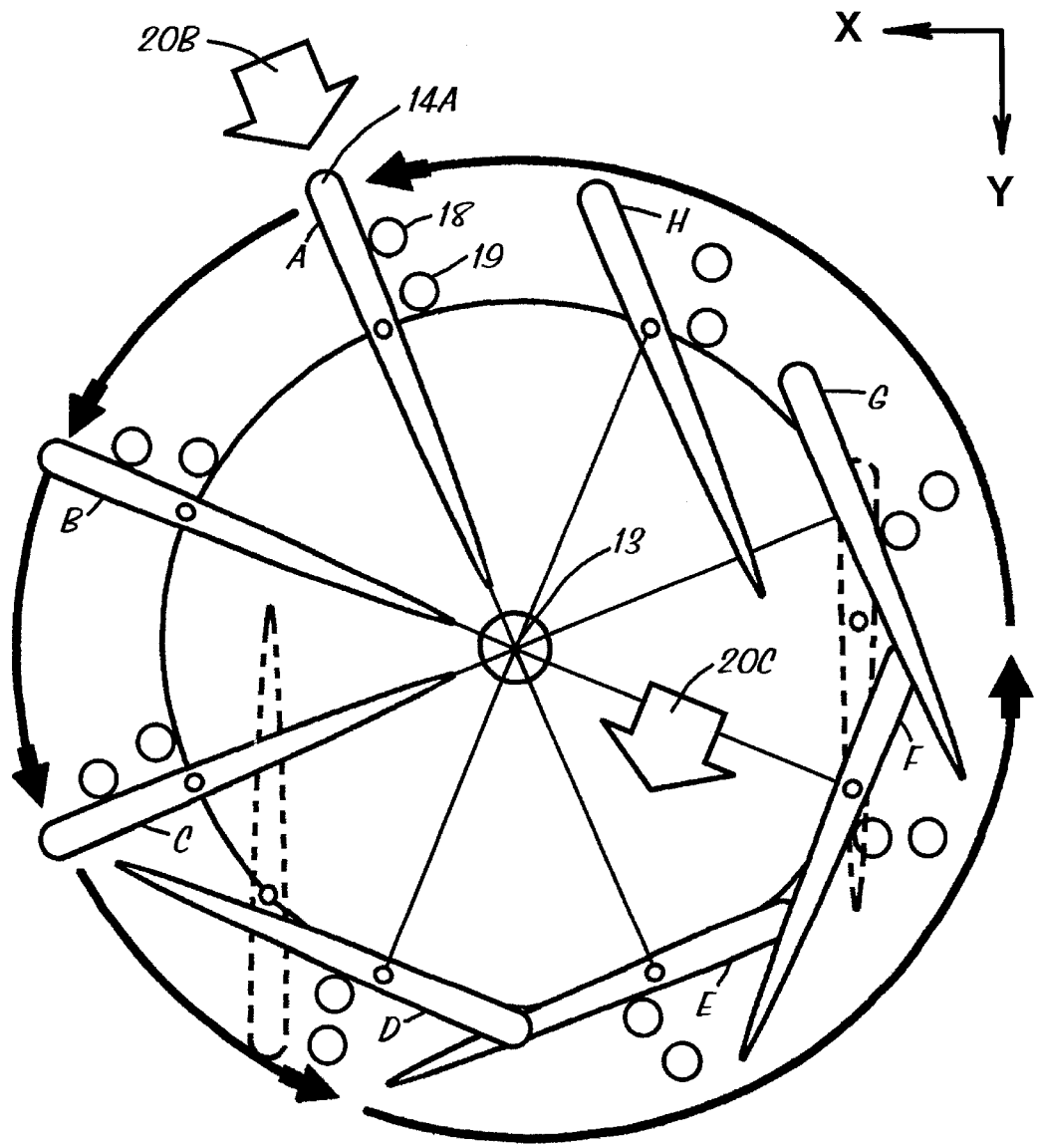
FIG. 7 is a diagrammatic representation similar to FIGS. 4 and 5 that illustrates some the combined relative wind effects on the airfoil.
Figure 8:
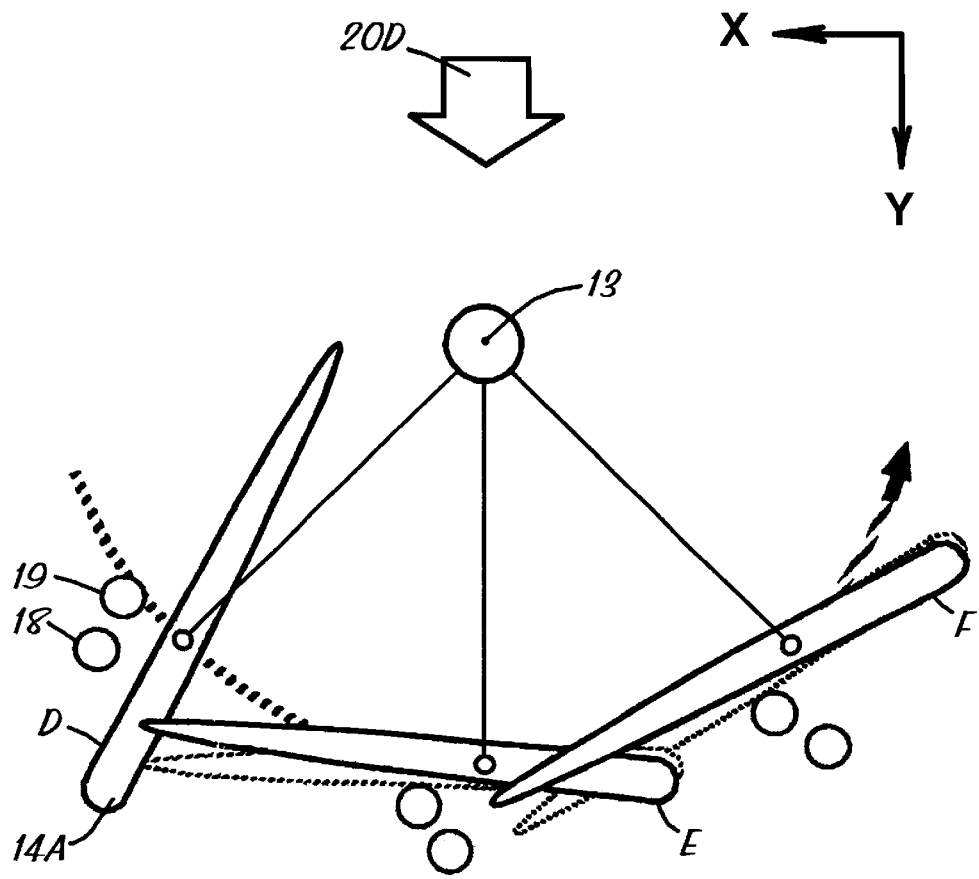
FIG. 8 is a diagrammatic representation that illustrates free flying aspects.

Rotation creates relative wind that makes the wind appear to shift in one direction on the windward side (FIG. 5) and in the opposite direction on the leeward side (FIG. 6). The result is a combination of effects on the windward and leeward sides of the rotor (FIG. 7). As for the effect of rotational lag during the transitional phase, the airfoil starts the transition at Position D. The airfoil then moves to Position E followed by Position F. For slower rotor RPM and/or less airfoil mass (indicated by the airfoil outline in dotted lines in FIG. 8), the airfoil contacts the tangential stop 18 in Position D and Position F. For faster rotor RPM and/or more airfoil mass (solid airfoil outline in FIG. 8), the airfoil does not contact the tangential stop 18.

Figure 9:
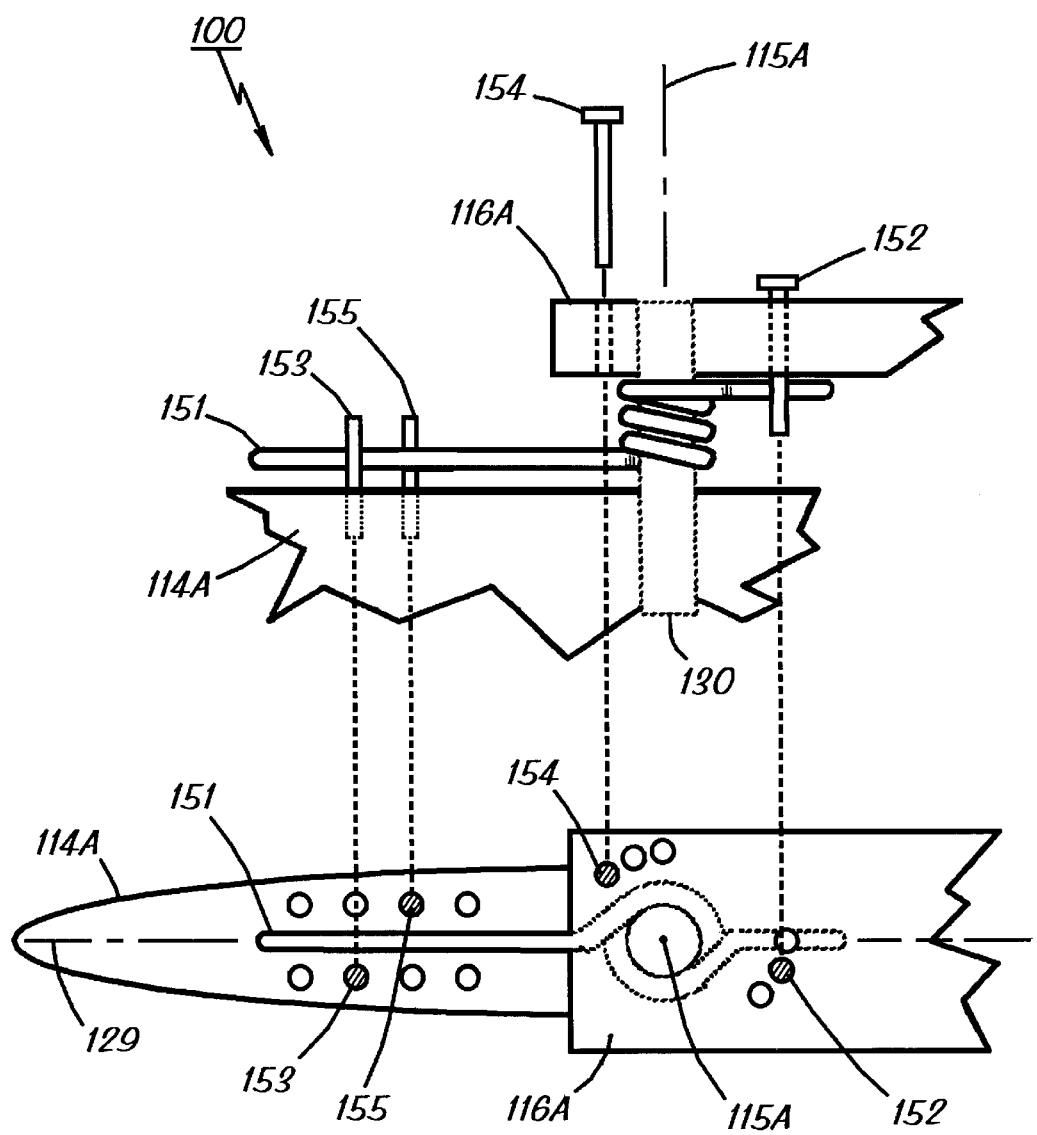
FIG. 9 a combination of plan and elevation views of a portion of a second embodiment of a vertical axis wind engine constructed according to the invention that has an alternate stop arrangement with a resiliently deformable adjustable bumper mechanism providing operator-adjustable radially aligned and tangentially aligned limits of pivotal movement.

FIG. 9 illustrates a portion of a second embodiment of a vertical axis wind engine constructed according to the invention that is designated generally in FIG. 9 as a wind engine 100. The wind engine 100 is similar in many respects to the wind engine 10 and so only differences are described in further detail. For convenience, reference numerals designating parts of the wind engine 100 are increased by one hundred over reference numerals designating similar or related parts of the wind engine 10.

The major difference in the wind engine 100 is that it includes an alternate stop arrangement. A resiliently deformable adjustable bumper mechanism (or stop mechanism) cooperates with a number of pins (e.g., four pins in this example) to provide the desired preset stop function. The adjustable bumper mechanism has a spring 151 (e.g., a resiliently deformable member) mounted coaxially on an axle 130 relative to a pivotal to axis 115A (similar to the axle 30 and pivotal axis 15A mentioned previously with reference to FIG. 2).

In this example, a first rotor-mounted pin 152 on the arm 116A and a first airfoil-mounted pin 153 on the airfoil 114A combine with the spring 151 as first stop means for limiting pivotal movement of the airfoil 114A to a first position of the airfoil 114A in which the angle-of-attack axis 129 of the airfoil 114A extends radially relative to a vertical axis of the wind engine 100 that is not visible in FIG. 9 but which is situated similar to the vertical axis 13 of the wind engine 10. Similarly, a second rotor-mounted pin 154 and a second airfoil-mounted pin 155 combine with the spring 151 as second stop means for limiting pivotal movement of the airfoil 114A to a second position of the airfoil 114A in which the angle-of-attack axis 129 of the airfoil 114A extends tangentially relative to the vertical axis of the wind engine 100. The rotor-mounted pins 152 and 154 are inserted in a selected hole to preset desired limits of pivotal movement. The airfoil-mounted pins 153 and 155 are inserted in a selected hole to preset a desired stiffness for the bumper mechanism 150.

Stops should constrain the movement of the airfoils without abruptness, allowing a "soft stop." Therefore, the stops should have some form of dampening action prior to fully constraining the airfoil. Otherwise, the airfoil tends to bounce out of position and cause unwarranted drag and vibration. Various types of dampener/stop arrangements may be designed and utilized, from the extremely simple to the extremely complex. A simple elastic shock cord, properly placed, can provide all the required characteristics.

From the foregoing descriptions, one of ordinary skill in the art might utilize a single stop that acts as both the radial and tangential stop. Doing so is simply a matter of finding a location where the two coincide.

While this might be feasible, the advantages of a single stop are far outweighed by the flexibility of using two separate stops. Depending on the average winds, airfoil materials, and other factors, the radial and tangential stops might need to exhibit different dampening qualities and be fine-tuned individually in terms of ideal placement.

Figure 10:
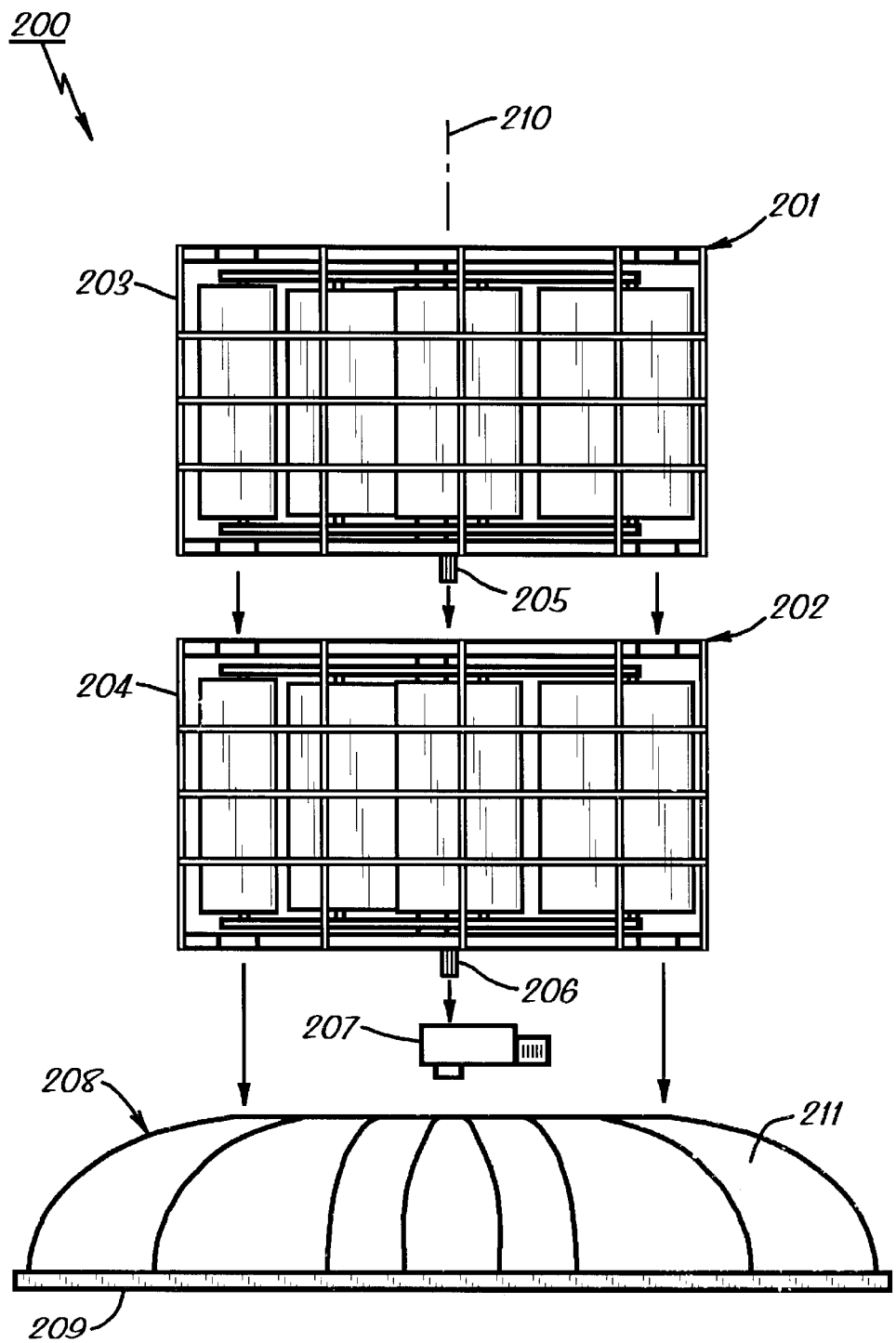
FIG. 10 is an exploded elevation view of an multiple wind engine installation having two, stacked vertical axis wind engines constructed according to the invention and an exponentially shaped structure for funneling wind toward the wind engines.

FIG. 10 shows a wind engine installation 200 having two wind engines 201 and 202 constructed according to the invention. The wind engines 201 and 202 are similar to the wind engine 100 and they include protective enclosures or cages 203 and 204. They are stacked vertically. A splined shaft 205 connects the wind engine 201 to the wind engine 202, and a similar splined shaft 206 connects the wind engine 204 to a power-generating component 207. An exponentially shaped structure, or exponential horn 208, atop a base 209 circumscribes the vertical axis 210. The exponential horn 208 has a exponentially shaped surface 211 that funnels wind toward the wind engines.

Figure 11:
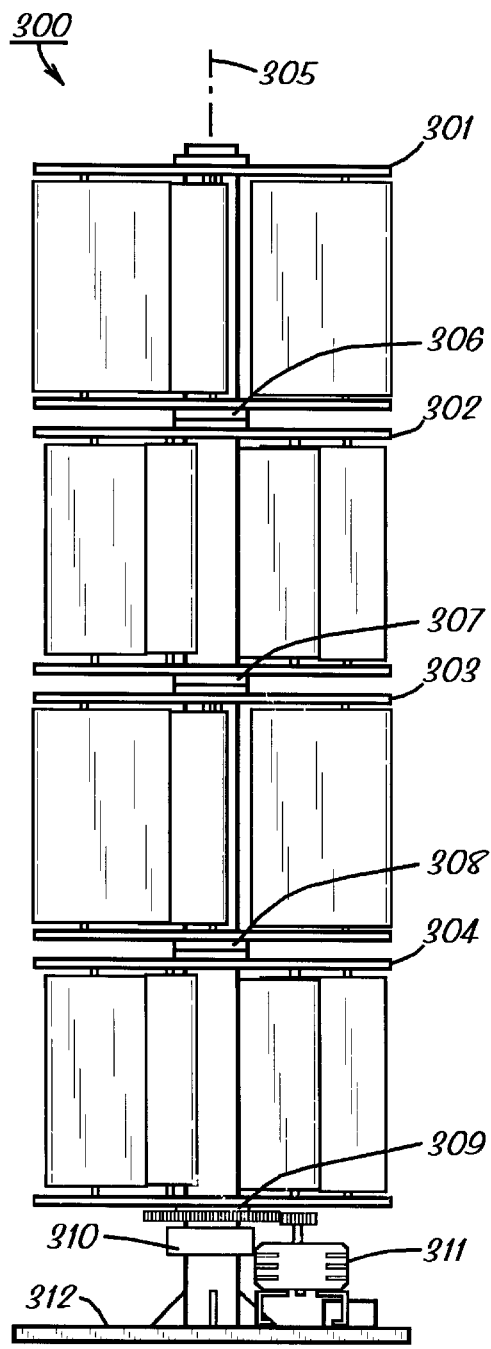
FIG. 11 is an elevation view of a rigid tower wind engine installation having four stacked vertical axis wind engines constructed according to the invention that are interconnected with connecting-ring-and-bearing assemblies.

FIG. 11 shows a wind engine installation 300 having four wind engines 301, 302, 303, and 304 constructed according to the invention that are stacked vertically for rotation about a vertical axis 305. Adjacent ones of the wind engines 301–304 are connected by connecting-ring-and-bearing assemblies 306, 307, and 308. A lower connecting-ring-and-bearing assembly 309 connects the lower wind engine 304 to a transmission 310. The transmission 310 couples rotational movement to a power generating component 311 that is set atop a concrete base 312 with the other components of the installation 300.

Figure 12:
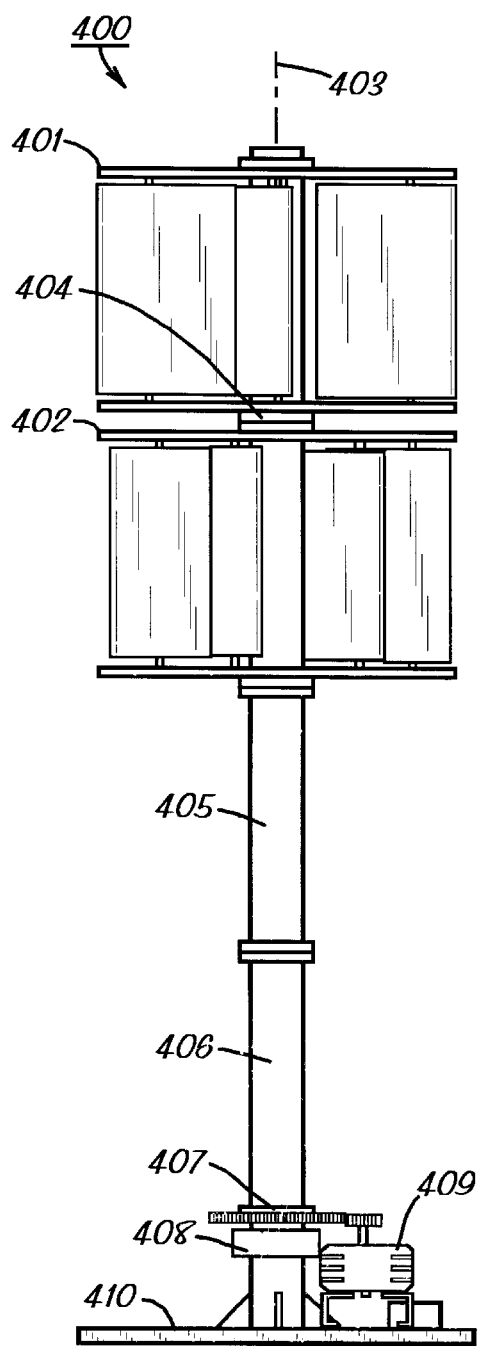
FIG. 12 is an elevation view of another rigid tower wind engine installation having two stacked vertical axis wind engines constructed according to the invention occupying elevated positions atop two modular extender tubes.

FIG. 12 shows a wind engine installation 400 having two wind engines 401 and 402 constructed according to the invention that are stacked vertically for rotation about a vertical axis 403. The wind engines 401 and 402 are connected by a connecting-ring-and-bearing assembly 404. They are elevated by two light, modular extend tubes 405 and 406. A lower connecting-ring-and-bearing assembly 407 connects the lower wind extend tube 406 to a transmission 408. The transmission 408 couples rotational movement to a power generating component 409 that is set atop a concrete base 410 with the other components of the installation 400.

Thus, the invention provides a vertical axis wind engine with at least one and preferably multiple self-positioning airfoils that introduces a five-step sequence to wind turbine technology, along with exponentially shaped wind funneling and stacked wind engine towers. The wind engine is a new lift-based VAWT design providing significantly improved performance, mechanical attributes, and aesthetics. Although exemplary embodiments have been shown and described, one of ordinary skill in the art may make many changes, modifications, and substitutions without necessarily departing from the spirit and scope of the invention.

What is claimed is:

1. A wind engine, comprising:

a support structure, a rotor mounted rotatably on the support structure for rotation about a vertical axis, and means for causing the rotor to rotate about the vertical axis in response to wind passing the wind engine;

wherein the means for causing the rotor to rotate includes at least one airfoil, which airfoil has vertically extending leading and trailing edges, an angle-of-attack axis extending horizontally through the leading and trailing edges, and a pivotal axis extending vertically intermediate the leading and trailing edges;

wherein the airfoil is mounted on the rotor for pivotal movement about the pivotal axis;

wherein the rotor includes means for limiting pivotal movement of the airfoil to first and second limits of pivotal movement;

wherein the airfoil is mounted on the rotor so that the airfoil is free to pivot about the pivotal axis intermediate the first and second limits of pivotal movement as the rotor rotates about the vertical axis in order to enable the airfoil to align the angle-of-attack axis according to the wind; and wherein at least one of the first and second stop means is adjustable to enable operator adjustment of the first and second limits of pivotal movement.

2. A wind engine, comprising:

a support structure, a rotor mounted rotatably on the support structure for rotation about a vertical axis, and means for causing the rotor to rotate about the vertical axis in response to wind passing the wind engine;

wherein the means for causing the rotor to rotate includes at least one airfoil, which airfoil has vertically extending leading and trailing edges, an angle-of-attack axis extending horizontally through the leading and trailing edges, and a pivotal axis extending vertically intermediate the leading and trailing edges;

wherein the airfoil is mounted on the rotor for pivotal movement about the pivotal axis;

wherein the rotor includes means for limiting pivotal movement of the airfoil to first and second limits of pivotal movement;

wherein the airfoil is mounted on the rotor so that the airfoil is free to pivot about the pivotal axis intermediate the first and second limits of pivotal movement as the rotor rotates about the vertical axis in order to enable the airfoil to align the angle-of-attack axis according to the wind; and wherein at least one of the first and second stop means includes a resiliently deformable bumper mechanism having an adjustable resilience in order to enable operator adjustment of the resilience.

* * * * *